3,442,674
AQUEOUS ALKALI METAL HYDROXIDE INSOLU-
BLE CELLULOSE ETHER MEMBRANE
Howard E. Hoyt and Helmuth L. Pfluger, Huntingdon
Valley, Pa., assignors to The Borden Company, New
York, N.Y., a corporation of New Jersey
No Drawing. Filed Apr. 6, 1965, Ser. No. 446,071
Int. Cl. C08b *21/26;* H01m *3/02*
U.S. Cl. 106—197                                      6 Claims

ABSTRACT OF THE DISCLOSURE

This invention relates to a membrane that is insoluble in an aqueous alkali metal hydroxide medium, said membrane comprising a resin which is a water-soluble $C_2$–$C_4$ hydroxyalkyl cellulose ether polymer and an insolubilizing agent for controlled water sorption, a dialytic and electrodialytic membrane and is particularly useful as a separator between electrodes or plates in an alkaline storage battery and will be described in connection therewith.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

Generally, in electric storage batteries of this type, one electrode is silver oxide, the other is zinc or cadmium, and the medium providing the bath between the electrodes is an aqueous solution of potassium hydroxide. There may be used for some purposes other alkali metal hydroxides, e.g., sodium or lithium hydroxide. The zinc or cadmium may be replaced by other metals that have a valence of at least 2 and are above cadmium in the electromotive series of the chemical elements, examples being aluminum, manganese and chromium. In such batteries it is necessary to have low electrical resistance of the membrane. It is a problem in batteries of this type, particularly when used for space exploration, to obtain membranes of adequate strength and stability when in contact with the alkali and silver oxide without the membrane being excessive in weight.

In our co-pending application, Ser. No. 396,716, filed Sept. 15, 1964, now abandoned, we have therein disclosed a battery separator membrane comprising a film which is a combination or solid solution of a cellulose ether such as methyl cellulose together with a resin which is either a polymer with dependent carboxyl groups such as sodium carboxy methyl cellulose or a polymer or copolymer of an alpha-unsaturated aliphatic acid. We have found that, although the membrane of the co-pending application has excellent conductivity and its tensile strength is superior to that of cellophane membranes which have previously been used in alkaline batteries, a separator membrane is required having still further improved tensile strengths. This property of higher tensile strength is especially needed in the course of assembling battery cells. The dry membrane should be capable of being wrapped around the electrodes without suffering physical damage.

The present invention provides a membrane that absorbs sufficient alkali solution to make sufficiently low the electrical resistance but is of very high tensile strength, even after immersion in and long contact with 25%–45% potassium hydroxide solution, said solution having silver oxide dispersed and dissolved therein. This is the corrosive environment to which the membrane is exposed when the battery is in operation.

Briefly stated, the invention provides a membrane which may also be referred to as a film or sheet, wherein said membrane comprises a resin that is a cellulose ether polymer with dependent hydroxyalkyl groups. The resin may be further combined with insolubilizing agents in order to prevent solutions of membranes made with said resin when the alkaline concentration of the battery cell is lowered to and below the threshold concentration at which the resin used to make the membrane is soluble. An example of a resin and insolubilizing agent that in combination illustrates one embodiment of the present invention is hydroxyethyl cellulose and methyl cellulose.

Using this combination of insolubilizing agent and resin, for instance, we have obtained membrane strengths from about 120% to 780% of the strength given by the control membrane consisting of regenerated cellulose sheeting (cellophane). Strength tests were conducted on membranes after immersion for 72 hours in a 30% potassium hydroxide solution which had been saturated with silver oxide ($Ag_2O$). Our membranes also are satisfactorily low in electrical resistance, all provided that the critical proportions hereinafter described are used in the membrane.

As to the resin, the lower hydroxyalkyl cellulose polymers are best suited and $C_{2-4}$ hydroxyalkyl cellulose ethers are preferred. Examples that illustrate the class to be used are hydroxy- ethyl, iso- and n-propyl and butyl cellulose. The degree of replacement of hydrogen atoms of the hydroxyl groups by hydroxyalkyl groups is between about .8 and 1.5 per glucose unit in the cellulose molecule.

As to the insolubilizing agent, lower alkyl cellulose ethers are preferred. Methyl and ethyl cellulose are satisfactory, particularly the methyl ether having a degree of substitution by $CH_3$ groups or if a higher alkyl ether is used, the corresponding alkyl radical, corresponding to replacement of 1.0–2 H's of the OH groups, per glucose unit in the cellulose.

The silver oxide used as one electrode is of grade and in form that is conventional in the commercial alkali batteries, there being some uncertainty as to whether the compound that is active in the battery function is silver oxide ($Ag_2O$) or silver peroxide (AgO). $Ag_2O$ is used throughout as representative of the oxide.

As to the proportions, when an insolubilizing agent is used, the ratio of the agent to the resin is dependent upon the concentration of alkali in the battery cell. Insolubilizing agents of the lower alkyl cellulose ether type and resins of the lower alkyl hydroxy cellulose type are separately soluble in water. Further, lower alkyl hydroxy cellulose resins are soluble in alkali solutions in concentrations up to about 40%. It has therefore been found necessary to add increasing proportions of insolubilizing agents to the resin composition as the alkali concentration of the cell is reduced below 40%. If insufficient quantities of said agent were to be used in the membrane composition for a specific alkali solution strength, the membrane would dissolve and therefore be useless for its intended purpose. Generally, up to 100% resin can be used at alkali concentrations of 40% and greater, and proportionately less resin as the concentration is reduced.

The following table shows proportions of ingredients at various alkali solution concentrations. The proportions are shown as illustrative of the proper range for best results. It is understood that the ranges given in the Table are by way of example and not by way of limitation, the only limitation upon the proportions being the minimum quantity of insolubilizing agent that will keep the lower alkyl hydroxy cellulose membrane from dissolving into the alkaline battery solution at the particular alkali concentration. Proportions here and elsewhere herein are expressed as parts by weight on a dry basis unless specifically stated to the contrary.

TABLE 1

| Percent alkali | For 100 parts total membrane composition | |
|---|---|---|
| | Resin | Insolubilizing agent |
| Over 40 | 100 | |
| 35-40 | 80-100 | 20-0 |
| 30-35 | 45-80 | 55-20 |
| Up to 30 | 1-45 | 99-55 |

By way of example of the deterioration that occurs if insufficient insolubilizing agent is used, a membrane of proportion of 50 parts hydroxyethyl cellulose and 50 parts of methyl cellulose was prepared and immersed in 30% potassium hydroxide. After 72 hours there was a significant falling off in strength of the membrane, indicating partial solubility in the alkaline solution.

If no resin is used in the membrane composition, the conductance as well as the strength falls off appreciably. In one example of such a system the ohms of resistance of a methyl cellulose membrane, after the 72 hours in an alkali solution, was objectionably high, actually 21 ohms in 30% KOH and 507 ohms in 40% KOH.

Alkaline storage batteries in which the membranes of this invention have utility generally operate with an alkali solution concentration in the range of between about 25%–45%. Concentrations outside this range are permissible, however, the efficiency of the battery falls off. The usually preferred alkali concentration is between about 28%–42%.

Important to note (see Table 2) is the excellent resistance to the action of silver oxide by the membrane of the present invention. Notice is taken of the lack of significant reduction in tensile strength of the membrane after exposure for 72 hours in 30% KOH solution and exposure for 72 hours in 30% KOH solution saturated with silver oxide. By way of contrast, an exposure test was performed with cellophane. There resulted a reduction in tensile strength of about 85% under the same exposure conditions.

The membrane may be prepared by combining aqueous solutions of the hydroxyalkyl cellulose compound and when required and in proportion sufficient to impart insolubility in the alkali solution, methyl cellulose or other lower alkyl cellulose ether. The resulting composition may be cast in sheet form and evaporated to dryness. Other forms may be made as for example plates, slabs, "buttons," films and the like. When the dried membrane is introduced into alkaline solution alkali is absorbed. Variations in the procedure include combining alkaline solutions of the components or adding alkali to said aqueous solution and then drying to form the cast. Alkaline solutions should not be so concentrated as to precipitate the components before drying.

The invention will be further illustrated by description in connection with the following specific examples of the practice of it, the proportions here and elsewhere herein are expressed as parts by weight unless specifically stated to the contrary.

Example 1

700 grams of a 10% methyl cellulose solution (Methocel 15) and 300 grams of 10% hydroxyethyl cellulose (Cellosize QP09) were completely mixed at 5° C. The ratio of methyl cellulose to hydroxyethyl cellulose was 7:3. Films were cast on levelled plate glass by the drawdown procedure using a 20 mil clearance on the doctor blade. Clear, homogeneous films of about 1.5 mil thickness were obtained.

By similar process films were made in which the ratios of hydoxyethyl cellulose to methyl cellulose were respectively, 1:9, 2.8, 3.5:6.5 and 5:5. The 5:5 and greater ratios are considered unsatisfactory for use in 30% KOH as the film disintegrated or dissolved in KOH solution of this concentration.

Samples of films were tested for tensile strength after, (1) conditioning at 50% relative humidity (R.H.) and 73° F. for one week, (2) immersion for 72 hours in 30% KOH solution and, (3) immersion for 72 hours in 30% KOH solution saturated with silver oxide. There was continuous stirring in the last mentioned solution. In each series, the conditioned membranes were blotted, to remove surface solution, and immediately tested on the tensile strength machine.

Table 2 tabulates the results obtained with films of this invention, in comparison with each other, with a cellophane (control) membrane of the prior art and with membranes made separately from each constituent component.

TABLE 2

| Proportions | Parts of hydroxyethyl cellulose for 100 parts membrane | | | | | | Cellophane control |
|---|---|---|---|---|---|---|---|
| | 100 | 0 | 10 | 20 | 30 | 35 | |
| Tensile strength at 50% R.H. and 73° F., p.s.i. | 5,250 | 8,340 | 10,330 | 9,720 | 11,120 | 8,680 | 17,320 |
| Flex test MIT [1] at 50% R.H. and 73° F., cycles | 720 | 3,065 | 10,000 | | 8,073 | 3,131 | 10,000 |
| Tensile strength after: | | | | | | | |
| (1) 72 hrs. in 30% KOH, p.s.i. | Sol. | 6,400 | | 5,420 | 5,860 | 1,090 | 3,130 |
| (2) 72 hrs. in Ag$_2$O-30% KOH suspension, p.s.i. | Sol. | 5,810 | | 6,940 | 5,320 | 976 | 457 |
| Absorption, percent of orig. wt.: | | | | | | | |
| (1) In 30% KOH | Sol. | 12 | 39 | 47 | 51 | 93 | 220 |
| (2) In 40% KOH | 65 | 12 | 31 | 35 | 55 | 57 | 300 |
| Resistance [2] of film, ±2 ohms: | | | | | | | |
| (1) Soaked 30% KOH | Sol. | 21 | 11 | 8 | 5 | ½ | 0-2 |
| (2) Soaked 40% KOH | 0 | 507 | 41 | 38 | 26 | 0 | 0-2 |

[1] 1 kg. tension on film.
[2] In conductivity cell with .2 inch diameter opening (resistance of cell plus membrane minus resistance of cell.

The membranes of columns "0" and "Cellophane Control" are not a part of the present invention.

The results show generally, the superiority of our membrane over the control membrane and methyl cellulose membrane, particularly in tensile strength and resistance measurements. Not tabulated is the fact that the silver oxide-KOH solution, having substantial oxidizing power, rendered the cellophane membrane opaque by a heavy coating of silver oxide, whereas the films of this invention, while discolored, retained their transparency. Also is the fact that, surprisingly, our membranes are generally as strong as the methyl cellulose membranes. A reinforcement action is observed when note is taken of the weighted tensile strength average of hydroxyethyl cellulose membranes and methyl cellulose membranes. That average is less than that of our membranes.

Although life tests on test storage cells are incomplete at this date, available results indicate that in one test the cells employing the membranes of column "30" and "35" in Table 2 underwent 32 and 30 cycles respectively, of charging and discharging before termination whereas control cells using battery grade cellophane failed after 15 to 21 cycles.

Example 2

The procedure and composition of Example 1 are used but with replacement of the hydroxyethyl cellulose by hydroxyiso- and n-propyl, and hydroxybutyl cellulose used separately and in turn in the various proportions of hydroxyalkyl cellulose to the total membrane combination as shown in Table 1. The films cast and dried are likewise clear and homogeneous. The test results are similar to those tabulated in Table 2.

Example 3

The procedure and compositions of Example 1 are followed in making membranes except that ethyl cellulose replaces methyl cellulose as the insolubilizing agent. The properties of the resulting membranes, with proportions varying as in Table 1, are similar to those tabulated in Table 2. The ethyl cellulose is water soluble.

The films of this invention may also be prepared from an organic solvent in place of the aqueous solvent. The organic solvent is a solvent for the resin and agent, such as butyl and higher alkyl alcohols.

It will be understood that it is intended to cover all changes and modifications of the examples of the invention herein chosen for the purpose of illustration which do not constitute departures from the spirit and scope of the invention.

We claim:

1. A membrane of high tensile strength being insoluble in aqueous alkali metal hydroxide medium, comprising a resin which is a water-soluble $C_{2-4}$ hydroxyalkyl cellulose ether polymer having between about 0.8 and 1.5 hydroxyalkyl groups per glucose unit in said cellulose polymer, and a water-soluble lower alkyl cellulose ether having from about 1 to about 2 alkyl groups per glucose unit in said lower alkyl cellulose ether, said water-soluble lower alkyl cellulose ether being present in an amount sufficient to keep the membrane from dissolving into the aqueous alkali metal hydroxide medium.

2. The membrane of claim 1, wherein said alkyl groups of said resin is selected from the groups consisting of ethyl, iso- and n-propyl and butyl.

3. The membrane of claim 1 wherein said resin is hydroxyethyl cellulose.

4. A separator membrane of high tensile strength being insoluble in aqueous alkali metal hydroxide medium, wherein said medium comprises alkali metal hydroxide in proportion up to about 45% by weight, comprising up to 100% by weight of resin which is a water-soluble $C_{2-4}$ hydroxyalkyl cellulose ether polymer having between about 0.8 and 1.5 hydroxyalkyl groups per glucose unit in said cellulose polymer, the difference from said 100% of said resin being an insolubilizing agent which is a water-soluble lower alkyl cellulose ether having from about 1 to about 2 alkyl groups per glucose unit in said lower alkyl cellulose ether, the proportion of said agent being increased as the concentration of said metal hydroxide is decreased in said medium.

5. The membrane of claim 4 wherein said alkyl group of said resin is selected from the group consisting of ethyl, iso- and n-propyl and butyl, and said agent is selected from the group consisting of methyl and ethyl cellulose.

6. A membrane of high tensile strength being insoluble in aqueous alkali metal hydroxide medium, said medium comprising between about 28% and 42% by weight of said alkali metal hydroxide, consisting essentially of hydroxyethyl cellulose having between about 0.8 and 1.5 hydroxyethyl groups per glucose unit in said hydroxyethyl cellulose and methyl cellulose having from about 1 to about 2 methyl groups per glucose unit in said methyl cellulose, in proportion between about 1 and 10 parts of hydroxyethyl cellulose for 10 parts of total membrane, the proportion of said hydroxyethyl cellulose being decreased as the concentration of said metal hydroxide is decreased in said medium.

References Cited

UNITED STATES PATENTS

| | | | |
|---|---|---|---|
| 2,763,030 | 9/1956 | Erickson | 106—197 |
| 2,810,659 | 10/1957 | Greminger et al. | 106—197 |
| 2,988,455 | 6/1961 | Rosenberg et al. | 106—197 |
| 3,057,942 | 10/1962 | Smith et al. | 136—179 |
| 3,091,542 | 5/1963 | Anderson | 106—197 |

ALLAN LIEBERMAN, *Primary Examiner.*

U.S. Cl. X.R.

136—146